United States Patent
Pfeiffer et al.

(10) Patent No.: US 10,431,784 B2
(45) Date of Patent: Oct. 1, 2019

(54) METHOD FOR CLAMPING A LITHIUM ION ACCUMULATOR, LITHIUM ION ACCUMULATOR AND MOTOR VEHICLE HAVING A LITHIUM ION ACCUMULATOR

(75) Inventors: Stefan Pfeiffer, Bamberg (DE); Michael Gless, Stuttgart-Zazenhausen (DE); Axel Bormann, Bamberg (DE); Conrad Bubeck, Esslingen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 1094 days.

(21) Appl. No.: 13/876,675

(22) PCT Filed: Aug. 9, 2011

(86) PCT No.: PCT/EP2011/063662
§ 371 (c)(1),
(2), (4) Date: Aug. 9, 2013

(87) PCT Pub. No.: WO2012/041588
PCT Pub. Date: Apr. 5, 2012

(65) Prior Publication Data
US 2013/0309538 A1 Nov. 21, 2013

(30) Foreign Application Priority Data
Sep. 30, 2010 (DE) .................. 10 2010 041 709

(51) Int. Cl.
*H01M 2/10* (2006.01)
*H01M 2/02* (2006.01)
*H01M 10/0525* (2010.01)

(52) U.S. Cl.
CPC ....... *H01M 2/1077* (2013.01); *H01M 2/0237* (2013.01); *H01M 2/1061* (2013.01);
(Continued)

(58) Field of Classification Search
CPC ............. H01M 2/0237; H01M 2/1061; H01M 2/1077; Y02E 60/122
See application file for complete search history.

(56) References Cited

U.S. PATENT DOCUMENTS

| 4,020,244 A | 4/1977 | Selinko |
| 9,318,731 B2* | 4/2016 | Lee .................... H01M 2/1083 |

(Continued)

FOREIGN PATENT DOCUMENTS

| DE | 10 2009 029 019 A1 | 3/2011 |
| EP | 1 990 861 A1 | 11/2008 |

(Continued)

OTHER PUBLICATIONS

International Search Report corresponding to PCT Application No. PCT/EP2011/063662, dated Oct. 24, 2011 (German and English language document) (5 pages).

(Continued)

*Primary Examiner* — Basia A Ridley
*Assistant Examiner* — Heng M. Chan
(74) *Attorney, Agent, or Firm* — Maginot, Moore & Beck LLP

(57) ABSTRACT

The disclosure relates to a method for clamping a lithium ion accumulator, which has a lithium ion accumulator cell stack having a top surface, a base surface opposite the top surface and a peripheral surface having four side surfaces, and at least two prismatic lithium ion accumulator cells. The lithium ion accumulator cell stack is clamped by at least one tension strap apparatus which is arranged and tensioned in the region of the peripheral surface, the ends of the tension strap meanwhile being kept free of tension. While free of tension, the ends of the tension strap are connected to each other directly or indirectly by using one or two plates, which are arranged on a side surface or two mutually opposite side (Continued)

surfaces of the peripheral surface. The disclosure further relates to a lithium ion accumulator and a motor vehicle having a lithium ion accumulator.

3 Claims, 2 Drawing Sheets

(52) U.S. Cl.
CPC ....... *H01M 10/0525* (2013.01); *Y02E 60/122* (2013.01); *Y02T 10/7011* (2013.01); *Y10T 29/49863* (2015.01); *Y10T 29/49947* (2015.01); *Y10T 29/49966* (2015.01); *Y10T 29/49968* (2015.01)

(56) References Cited

U.S. PATENT DOCUMENTS

| | | | | |
|---|---|---|---|---|
| 2008/0044714 A1* | 2/2008 | Fritz | ................... | H01M 8/0202 429/433 |
| 2008/0280194 A1* | 11/2008 | Okada | ................ | H01M 2/1077 429/99 |
| 2011/0117401 A1* | 5/2011 | Lee | ..................... | H01M 2/0245 429/82 |
| 2011/0262797 A1* | 10/2011 | Kim | ..................... | H01M 2/1077 429/149 |
| 2011/0287298 A1* | 11/2011 | Park | ..................... | H01M 2/1077 429/156 |
| 2012/0115013 A1* | 5/2012 | Kim | ..................... | H01M 2/1077 429/159 |

FOREIGN PATENT DOCUMENTS

| | | |
|---|---|---|
| JP | 2008-277085 A | 11/2008 |
| JP | 2008-282582 A | 11/2008 |
| JP | 2008277085 A * | 11/2008 |

OTHER PUBLICATIONS

D. P. Wilkinson, et al., Effects of Physical Constraints on Li Cyclability, Journal of Power Sources, 36 (1991), pp. 517-527.

* cited by examiner

METHOD FOR CLAMPING A LITHIUM ION ACCUMULATOR, LITHIUM ION ACCUMULATOR AND MOTOR VEHICLE HAVING A LITHIUM ION ACCUMULATOR

This application is a 35 U.S.C. § 371 National Stage Application of PCT/EP2011/063662, filed on Aug. 9, 2011, which claims the benefit of priority to Serial No. DE 10 2010 041 709.2, filed on Sep. 30, 2010 in Germany, the disclosures of which are incorporated herein by reference in their entirety.

The present disclosure relates to a method for clamping a lithium ion accumulator which has a lithium ion accumulator cell stack having a top surface, a base surface opposite the top surface and a circumferential surface having four side surfaces, and consisting of at least two prismatic lithium ion accumulator cells, to a lithium ion accumulator and to a motor vehicle having an electric drive motor for driving the motor vehicle and a lithium ion accumulator which is connected or is connectable to the electric drive motor.

BACKGROUND

Lithium ion accumulator cells expand during operation and the "formation". According to D. P. Wilkinson, Effects of Physical Constraints on Li cyclability, Journal of Power sources 36, 1991, pages 517 to 527, the morphology of the lithium in a lithium ion accumulator cell is porous even after just a few charging/discharging cycles if too little pressure (p<0.1 MPa) is exerted on the lithium ion accumulator cell, and therefore the latter fails after a few charging/discharging cycles. In order to achieve optimum power and a long service life for lithium ion accumulator cells, a defined pressure which acts on said lithium ion accumulator cells is therefore required.

However, conventional pretensioning concepts which can build up this pressure are inflexible, expensive and take up a very large amount of space.

JP 2008277085 A discloses a battery pack in which the individual battery cells, between which spacers are arranged, are fixed to one another by a strap which has apertures over the entire length. The purpose of this configuration is adequate ventilation in order to avoid overheating during operation.

SUMMARY

The disclosure indicates a method for clamping a lithium ion accumulator which has a lithium ion accumulator cell stack. The lithium ion accumulator cell stack to be clamped has a top surface, a base surface opposite the top surface and a circumferential surface having four side surfaces, wherein the connections of the lithium ion accumulator cells are preferably arranged on the top surface.

At least two, preferably six prismatic lithium ion accumulator cells are used for the lithium ion accumulator cell stack.

The lithium ion accumulator cell stack is clamped by means of at least one tension strap which is arranged and tensioned in the region of the circumferential surface.

The at least one tension strap is tensioned in such a manner that, in the meantime, the ends of the tension strap are kept in a tension-free state and, in said state, the ends of the strap are connected to each other directly or indirectly using one or two plates which are arranged on one side surface or two mutually opposite side surfaces of the circumferential surface.

Three method alternatives are therefore provided. In the first alternative, at least one tension strap is guided around the cell stack in the region of the circumferential surface and tensioned, wherein the ends of the strap are kept in a tension-free state and, in said state, the ends of the strap are connected to each other. In the second alternative, a plate is arranged on a side surface of the circumferential surface, wherein at least one strap is guided over the free side surfaces and tensioned, and wherein the ends of the strap are held in a tension-free state and, in said state, the ends of the strap are connected to the plate. For the third alternative, a plate is in each case arranged on two mutually opposite side surfaces of the circumferential surface, wherein at least one strap in each case is guided over the free, mutually opposite side surfaces and is tensioned, and wherein the ends of the strap are held in a tension-free state and, in this state, the ends of the straps are connected to in each case one of the two plates.

Ultimately, after the method has been carried out, the clamping is intended to have a defined value, and therefore the at least one tension strap exerts a compressive force of preferably 0.01 MPa to 2 MPa, particularly preferably of 0.6 MPa to 0.8 MPa, on the strapped-together lithium ion accumulator cells.

This approach has the advantage that, even after the connection, the at least one tension strap has a defined tensile stress which is necessary for optimum operation of the lithium ion accumulator.

The lithium ion accumulator cell stack is additionally preferably also compressed before or during the tensioning of the at least one tension strap, and this, in turn, improves the maintaining of a defined tensile stress.

The direct or indirect connection of the free ends of the at least one tension strap is undertaken by means of a welded joint, a screw connection or a clamping connection, wherein a welded joint is preferred, since, in this case, the ends of the tension strap are subjected to the smallest mechanical load and the required tensile stress can be precisely set.

In order to keep the free ends of the tension strap free of tension during the tensioning, said ends each have a passage opening in which a device engages and tensions the tension strap such that the region between the passage opening and the end of the tension strap advantageously remains free of tension.

Since a tension strap needs much less space than a screw or similar component, the clamping of a lithium ion accumulator cell stack with a tension strap enables the clamping of the lithium ion accumulator cells to be undertaken in minimal space. This makes it possible to increase the energy density of the lithium ion accumulator since more space is now available for the individual lithium ion accumulator cells.

A tension strap as a product sold by the meter is also more advantageous than piece goods, such as screws or similar components. Furthermore, an individual lithium ion accumulator can be constructed very flexibly, since the individual lithium ion accumulator cells of the stack can be clamped independently of the housing. This also makes it possible easily to interchange individual lithium ion accumulator cells from the stack. Finally, the design of a lithium ion accumulator is completely independent of the connecting means, since the tension strap is theoretically sold in an endless length and can be cut to the required length right on site and provided with passage openings in order to connect as many lithium ion accumulator cells to one another as desired. The lithium ion accumulator cells themselves can also be subjected to tolerances of arbitrary size, and therefore even larger and thicker lithium ion accumulator cells, for example for drive accumulators of an electric vehicle, can be clamped.

The tension strap can preferably be configured to be entirely or partially pierced in order to modify the flexibility and other mechanical properties of the tension strap.

According to the disclosure, a lithium ion accumulator which has a lithium ion accumulator cell stack having a top surface, a base surface opposite the top surface and a circumferential surface having four side surfaces, and consisting of at least two prismatic lithium ion accumulator cells, is also provided wherein at least one tensioned tension strap is arranged in the region of the circumferential surface, the ends of said tension strap being connected to each other directly or by means of one or two plates which are arranged on one side surface or two mutually opposite side surfaces of the circumferential surface, wherein passage openings are located in the region of the ends of the at least one tension strap.

Of course, the explanations regarding the method also relate analogously to the configuration of the lithium ion accumulator, and vice versa.

Hobs, i.e. spacers, can preferably be arranged between the tension strap, at least at the connecting point, and the circumferential surface, in order not to damage the lithium ion accumulator cells during the connection of the ends of the tension strap.

In the event of indirect connection of the ends of the tension strap by means of one or else two plates, the ends of the tension strap are connected to the plates over as large a surface area as possible in order to obtain a connection which can be subjected to a load.

For this technique, use is preferably made according to the disclosure of steel straps, since said straps can absorb very high forces. Said forces are required, for example, for clamping cells of a lithium ion accumulator in order to ensure a sufficiently long surface life of the accumulator.

Flat tension straps can transmit the force uniformly over a large area to the lithium ion accumulator cells.

In a preferred embodiment of the disclosure, at least one second tension strap can be tensioned around the circumferential surface of the lithium ion accumulator cell stack.

The disclosure also relates to a motor vehicle having an electric drive motor for driving the motor vehicle and a lithium ion accumulator according to the disclosure which is connected or is connectable to the electric drive motor.

The disclosure advantageously makes it possible to provide a lithium ion accumulator cell stack consisting of prismatic lithium ion accumulator cells, in which the lithium ion accumulator cells can be clamped at high pressure, flexibly and at a reasonable cost.

BRIEF DESCRIPTION OF THE DRAWINGS

Exemplary embodiments of the disclosure are explained in more detail with reference to the drawings and the description below. In the drawings.

DETAILED DESCRIPTION

Figure 1:
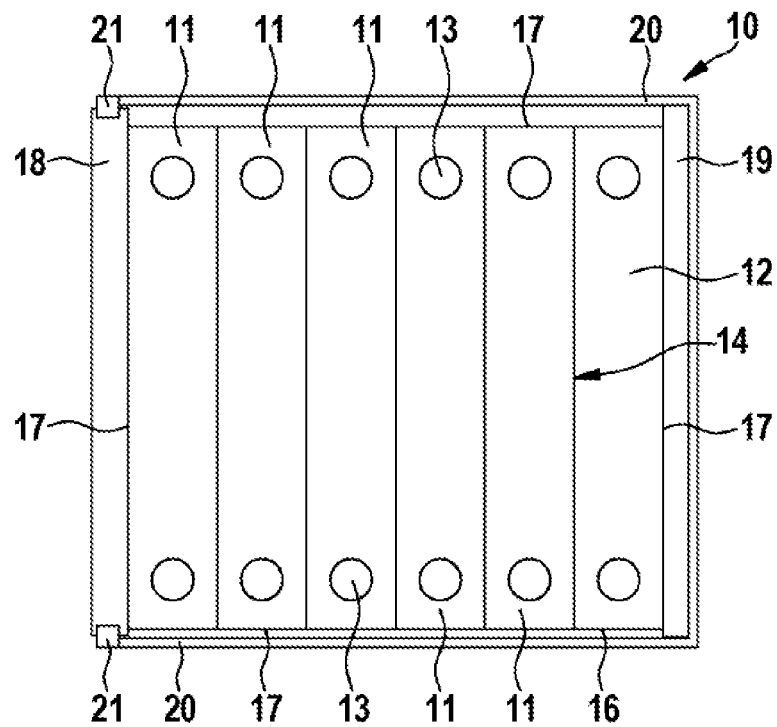
FIG. 1 shows a top view of a lithium ion accumulator having plates arranged on opposite side surfaces of the lithium ion accumulator.
Figure 2:
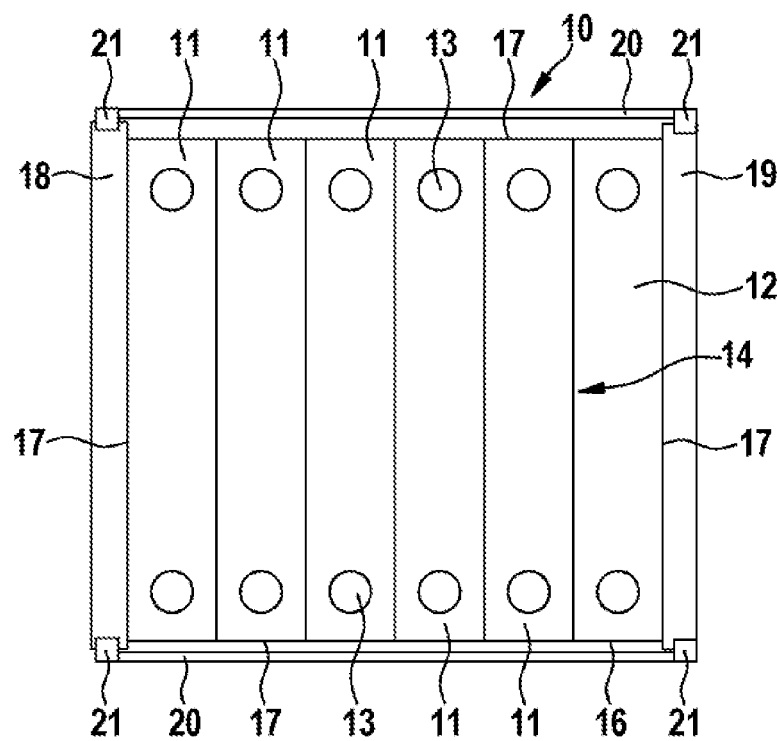
FIG. 2 shows a top view of another embodiment of a lithium ion accumulator having plates arranged on opposite side surfaces of the lithium ion accumulator.
Figure 3:
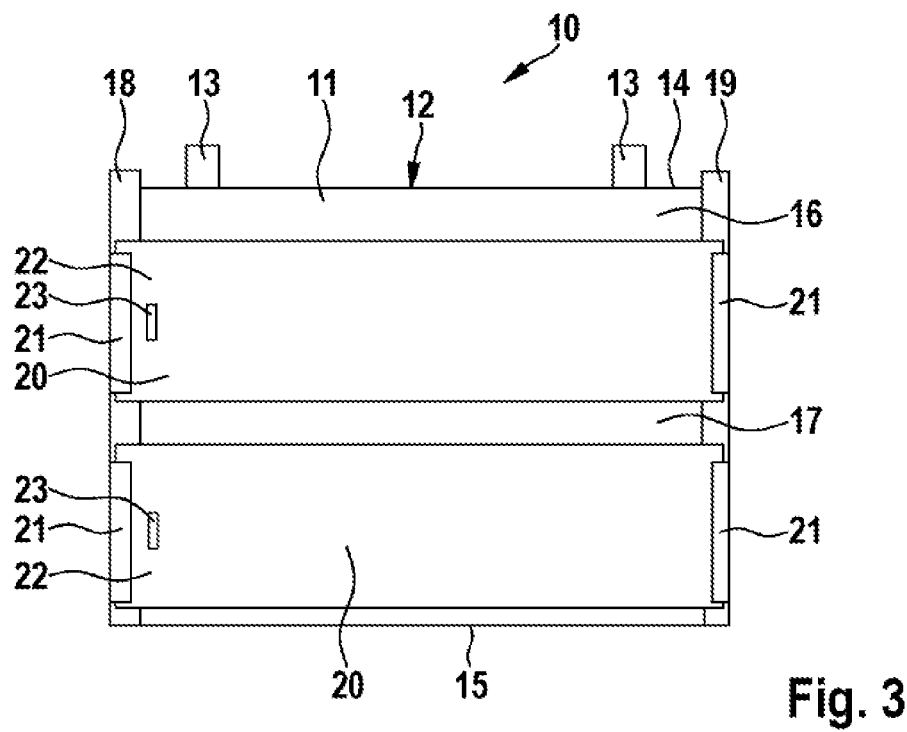
FIG. 3 shows a side view of a lithium ion accumulator having plates arranged on opposite side surfaces of the lithium ion accumulator, according to FIG. 2.
Figure 4:
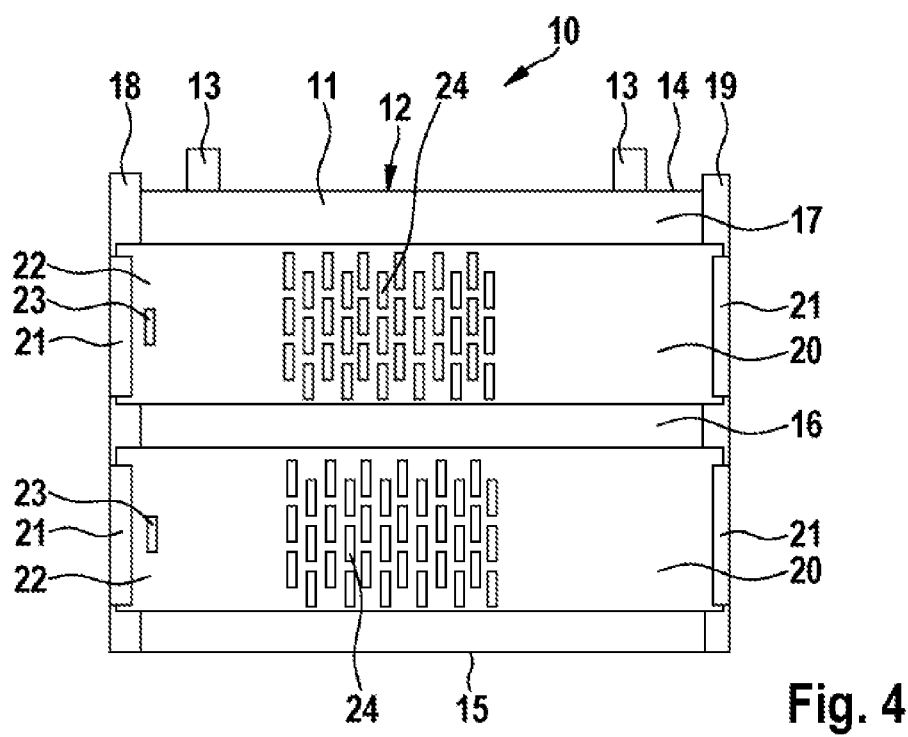
FIG. 4 shows a side view of a lithium ion accumulator having plates arranged on opposite side surfaces of the lithium ion accumulator, according to FIG. 2, wherein the tension straps have apertures.

FIGS. 1 to 4 each show a lithium ion accumulator 10 having six lithium ion accumulator cells 11 which are joined together to form a stack 12. The connections 13 of the lithium ion accumulator cells 11 are arranged on the top surface 14 of the lithium ion accumulator 10. In addition, the lithium ion accumulator 10 has a base surface 15 and a circumferential surface 16 which, in turn, has four side surfaces 17. A plate 18, 19 is arranged in each case on two mutually opposite side surfaces 17, said plate, upon clamping, uniformly distributing the pressure to the lithium ion accumulator cells 11. Tension straps 20 are provided for the clamping, wherein two tension straps 20 are in each case arranged next to each other on the circumferential surface 16, thus achieving a more uniform distribution of force than in the case of just one tension strap. In the embodiment according to FIG. 1, each tension strap 20 is fixed to a plate 18 by means of a weld seam 21 and is guided around the second plate 19 on the opposite side surface 17 and is fixedly connected to the first plate 18 in turn by a second weld seam 21. By contrast, in the embodiment according to FIGS. 2 to 4, the tension straps 20 are in each case fixed to the two plates 18, 19 on the opposite sides 17 by a weld seam 21. In order to be able to tension the tension straps 20 and weld the ends thereof in the tension-free state, said tension straps have a passage opening 23 in which a tensioning device can engage. In FIG. 4, the tension straps 20 also have apertures 24 with which the mechanical properties of the tension straps 20 can be varied.

The invention claimed is:

1. A method for clamping a lithium ion accumulator comprising a lithium ion accumulator cell stack having a top surface, a base surface opposite the top surface, and a circumferential surface having four side surfaces, and at least two prismatic lithium ion accumulator cells, the method comprising:
    positioning at least one tension strap apparatus around the circumferential surface of the lithium ion accumulator cell stack, wherein the at least one tension strap apparatus includes a first end and a second end;
    tensioning only a portion of the at least one tension strap in a region of the circumferential surface less than the entire circumferential surface, while keeping the first end and the second end of the at least one tension strap apparatus in a tension-free state; and
    then connecting the first end and the second end of the at least one tension strap apparatus to each other indirectly, during the tension-free state, using one or two plates which are positioned on one side surface or two mutually opposite side surfaces of the circumferential surface, wherein at least the first end or the second end of the at least one tension strap apparatus is connected to at least one plate,
    wherein the indirect connection of the first end and the second end of the at least one tension strap apparatus is produced by at least one of a welded joint, a screw connection, and a clamping connection.

2. The method as claimed in claim 1, further comprising: compressing the lithium ion accumulator cell stack before or during tensioning of the at least one tension strap apparatus.

3. The method as claimed in claim 1, wherein:
the at least one tension strap apparatus defines a first passage opening and a second passage opening,
a device is configured to engage the first passage opening and the second passage opening to tension the at least one tension strap apparatus,
a first region of the at least one tension strap apparatus located between the first passage opening and the first end remains free of tension, and
a second region of the at least one tension strap apparatus located between the second passage opening and the second end remains free of tension.

\* \* \* \* \*